United States Patent Office 3,157,604
Patented Nov. 17, 1964

3,157,604
POLYMERIZATION INITIATORS
Charles W. Strobel, Bartlesville, Okla., assignor to Phillips Petroleum Company, a corporation of Delaware
No Drawing. Filed Oct. 24, 1960, Ser. No. 64,278
10 Claims. (Cl. 252—431)

This invention relates to an improved method of preparing a polymerization initiator which is a lithium adduct of conjugated dienes and/or vinylidene-substituted aromatic compounds. In another aspect, it relates to the initiator compositions thus prepared and to the use of these initiators in the polymerization of conjugated dienes.

It has been disclosed in copending application Serial No. 772,167 of Uraneck, Short, Hsieh and Zelinski, filed November 6, 1958, that highly useful polymeric products can be obtained by polymerizing vinylidine-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal groups on the ends of the polymer molecules enables substantially more effective cures since all of the molecule can be tied into the cross-linked structure. Also by simple coupling arrangements alone or with auxiliary curing, liquid polymers can be readily converted into solids, and soft tacky polymers can be made quite rigid. The term "telechelic" has been coined to define these terminally reactive polymers. As used in this specification, telechelic polymers means polymers of vinylidine-containing monomers which contain a reactive group on each end of the polymer molecule.

Organo dilithium initiators employed for the production of polymers containing terminal reactive groups are generally prepared in polar solvents such as diethyl ether or tetrahydrofuran and when used for diene polymerization a considerable amount of 1,2-addition and/or 3,4-addition occurs. In other words, the product has a higher vinyl content than may be desired. By "vinyl content," I mean to include not only vinyl branching but also vinylidene branching such as the alpha-methylvinyl branching which occurs by the 3,4-addition of isoprene. Reduction in the vinyl content lowers the freeze point of these polymers and is, therefore, of particular significance when these polymers are to be used at low temperatures. For example, it has been pointed out by Short et al. in Rubber Chemistry and Technology 32, No. 2, pages 614 to 627, that polybutadienes of high cis content can be compounded to prepare vulcanizates which remain flexible at very low temperatures, whereas the vinyl polybutadienes are seriously limited in their usefulness as elastomers at low temperatures. It has further been found that compounded and cured polymers of conjugated dienes containing a low vinyl content have higher elongations at very low temperatures, for example, at about −40 to −70° F., and are, therefore, more resistant to shock than are similar compositions made from polymers having higher vinyl content.

In the polymerization of a conjugated diene polymer, the presence of a polar solvent has been found to encourage the formation of vinyl configuration within the polymer so that it is desirable that the concentration of the initiator be as high as possible so that a minimum amount of the polar solvent is charged to the polymerization mixture with the initiator. Also, since the organic portion of the initiator enters the molecule of the conjugated diene polymer, when the initiator itself is formed from a conjugated diene it is desirable that the initiator molecule, which has predominantly vinyl structure, be as small as possible. It is highly desirable that initiator systems of the organolithium type be developed for the polymerization of conjugated diene homopolymers or copolymers containing less than 40 and preferably less than 30 percent vinyl unsaturation.

I have now found that polymerization initiator compositions capable of polymerizing conjugated dienes to polymers of low vinyl content can be prepared by contacting lithium in a medium of aliphatic monoether with a conjugated diene or a vinylidene-substituted aromatic compound in the presence of a polycyclic aromatic compound or a polyaryl-substituted ethylene.

It is an object of my invention to provide an improved method of preparing a lithium adduct of a conjugated diene and/or a vinylidene-substituted aromatic compound.

Another object is to provide lithium adducts of vinylidene-substituted aromatic compounds or conjugated dienes in relatively high molar concentration in an ether solvent.

Another object of my invention is to provide a method of preparing an adduct of lithium and dialkylbutadiene which does not require vigorous agitation and which encourages the formation of products containing from 1 to 5 diene units per 2 lithium atoms.

Still another object is to provide a method of preparing conjugated diene polymers having low vinyl-content.

Other objects, advantages and features of my invention will be apparent from the following discussion.

In describing my invention, the conjugated dienes and the vinylidene-substituted aromatic compounds are referred to as "monomers." The polycyclic aromatic compounds and polyaryl-substituted ethylenes are referred to as "promoters" although their role in the formation of the initiator composition is not fully understood. The conjugated dienes from which the lithium adducts of this invention are prepared are 1,3-conjugated dienes containing from 4 to 12, inclusive, carbon atoms per molecule. Examples of these compounds include the following:

1,3-butadiene,
isoprene,
2,3-dimethyl-1,3-butadiene,
1,3-pentadiene (piperylene),
2-methyl-3-ethyl-1,3-butadiene,
3-methyl-1,3-pentadiene,
2-methyl-3-ethyl-1,3-pentadiene,
2-ethyl-1,3-pentadiene,
1,3-hexadiene,
2-methyl-1,3-hexadiene,
1,3-heptadiene,
3-methyl-1,3-heptadiene,
1,3-octadiene,
3-butyl-1,3-octadiene,
3,4-dimethyl-1,3-hexadiene,
3-n-propyl-1,3-pentadiene,
4,5-diethyl-1,3-octadiene,
phenyl-1,3-butadiene,
2,3-diethyl-1,3-butadiene,
2,3-di-n-propyl-1,3-butadiene,
2-methyl-3-isopropyl-1,3-butadiene, and the like.

Among the dialkylbutadienes, it is preferred that the alkyl groups contain from 1 to 3 carbon atoms.

In addition to or in place of the above-described conjugated diolefins, vinylidene-substituted aromatic compounds can be combined with lithium to form polymerization initiators. These compounds include styrene, alpha-methylstyrene, 1-vinylnaphthalene, 2-vinylnaphthalene, 1-alpha-methylvinylnaphthalene, 2-alpha-methylvinylnaphthalene, and alkyl, cycloalkyl, aryl, alkaryl, and aralkyl derivatives thereof in which the total number of carbon atoms in the combined hydrocarbon substituents is generally not greater than 12. Examples of these compounds include:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenyl-alpha-methylstyrene
2,4,6-tri-tert-butyl-alpha-methylstyrene
2,3,4,5-tetramethyl-alpha-methylstyrene
4-(4-phenyl-n-butyl)-alpha-methylstyrene
3-(4-n-hexylphenyl)-alpha-methylstyrene
4,5-dimethyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
5,8-dicyclopentyl-2-vinylnaphthalene
3-hexyl-7-phenyl-2-vinylnaphthalene
2,4,6,8-tetramethyl-1-alpha-methylvinylnaphthalene
3,6-diethyl-1-alpha-methylvinylnaphthalene
6-benzyl-1-alpha-methylvinylnaphthalene
3-methyl-5,6-diethyl-8-n-propyl-2-alpha-methylvinylnaphthalene
4-o-tolyl-2-alpha-methylvinylnaphthalene
5-(3-phenyl-n-propyl)-2-alpha-methylvinylnaphthalene,
and the like.

The lithium can be used in any form desired, such as wire, chunks, or shot, or in a finely divided state. It is preferred that at least one gram atom of lithium be used per mole of monomer and generally 2 or more gram atoms per mole of monomer is employed. The presence of excess (for example, 5 to 50 weight percent excess) lithium serves to minimize polymerization of the monomer.

When preparing the initiators, the monomer, solvent, lithium and promoter are contacted under mild agitating conditions, or vigorous agitation if desired, in an inert atmosphere such as argon or nitrogen. Suitable solvents are the aliphatic monoethers. The methoxyethers are to be avoided since they are too active. The aliphatic monoethers which can be used individually or as mixtures are represented by the formula ROR in which R is an alkyl group containing from 2 to 12 carbon atoms. Compounds which are representative of the suitable ethers include diethyl ether, di-n-propyl ether, diisopropyl ether, ethyl isopropyl ether, ethyl n-butyl ether, di-n-butyl ether, isopropyl tert-butyl ether, n-propyl n-butyl ether, di-n-amyl ether, diisoamyl ether, di-n-hexyl ether, di-(2-ethylhexyl) ether, dioctyl ether, isopropyl octyl ether, didecyl ether, didodecyl ether, ethyl dodecyl ether, di-tert-butyl ether, di-(2,4,6-trimethyloctyl) ether, di-(2,4-diisopropylhexyl) ether, and the like.

The promoters are known generally as polycyclic aromatic compounds or polyaryl-substituted ethylenes. Preferably these include condensed ring aromatic compounds such as naphthalene, anthracene and phenanthrene; monoalkyl-substituted condensed ring aromatics in which the alkyl group contains 1 to 3 carbon atoms, such as 1-methylnaphthalene, 2-methylnaphthalene, 1-ethylnaphthalene, 2-ethylnaphthalene, 1-n-propylnaphthalene, 2-isopropylnaphthalene, 1-methylanthracene, 1-ethylanthracene, 2-n-propylanthracene, 2-methylphenanthrene, 4-ethylphenanthrene, and the like; and polyaryl-substituted ethylenes which contain 2, 3 or 4 aryl groups such as phenyl and/or naphthyl, such as 1,1-diphenylethylene; 1,2-diphenylethylene (stilbene); triphenylethylene; tetraphenylethylene; 1-phenyl-1-naphthylethylene; 1,2-dinaphthylethylene; 1,1-diphenyl-2-naphthylethylene; tri-naphthylethylene; and the like. Other polycyclic aromatics such as biphenyl, terphenyls and dinaphthyl can also be used.

The relative amounts of monomer, promoter and solvent employed in preparing the initiator compositions are conveniently expressed as a molar ratio based upon the monomer used. The amount of ether employed is rarely less than an equal molar ratio to the monomer and as much as 20 moles of ether per mole of monomer can be used. I have found that about 2 to 8 moles of ether per mole of monomer gives very satisfactory results and in general it is desirable to keep the concentration of ether low.

The promoter can be used in amounts ranging from 0.005 to 2 moles per mole of monomer. The promoter encourages the formation of adduct and retards polymerization of the monomer. It is desirable that the adduct contain not over 10 monomer units per 2 lithium atoms on the average and preferably the adduct contains an average of 1 to 5 monomer units per 2 lithium atoms. As pointed out above, it is advantageous to have the molar concentration of the dilithium adduct in the ether as high as possible. Minimizing polymerization of the monomer during adduct formation enables higher concentrations of adduct to be obtained. In general, it is desirable to use higher amounts of promoter when preparing adducts from the more active monomers such as butadiene, styrene and isoprene. With these monomers at least about 0.1 mole of promoter per mole of monomer is preferred. The dialkylbutadienes such as 2,3-dimethyl-1,3-butadiene are, on the other hand, less active toward polymerization and less promoter is required for comparable results.

The reaction temperature can range from −40 to 170° F. but is preferably in the range of −25 to 125° F. Temperatures should be below 41° F. for active monomers such as 1,3-butadiene and styrene, and below 100° F. for isoprene. For the less active monomers such as dimethylbutadiene, it is preferred to operate at temperatures of 41° F. and above. The time required for formation of the adduct depends upon various factors such as temperature, rate of agitation, and concentration of the diene solution. In general, the time required is in the range from about 10 minutes to 100 hours or longer.

The initiator compositions hereinbefore described are frequently obtained in the form of slurries. When making a liquid polymer, it is preferred that the initiator be soluble in the polymerization medium. This method of operation is in the interest of obtaining a polymer having a narrow molecular weight range. These initiator compositions can be solubilized by the addition of any of the conjugated dienes or aromatic monomers used in their preparation. The solubilizing agent is added slowly or in increments in order to control the temperature. Solubilization is generally effected at a temperature in the range from 20 to 60° F., preferably below 50° F. Too high a temperature causes decomposition of the adduct. The quantity of solubilizing agent will depend upon the adduct being solubilized as well as upon the agent used, and will generally be in the range from 2 to 10 moles per mole of adduct, preferably 2 to 6 moles.

The monomers which can be polymerized in the presence of the lithium adducts of my invention are conjugated dienes containing from 4 to 12 carbon atoms, preferably 4 to 8 carbon atoms per molecule. Examples of these conjugated dienes are the same as those given above in regard to the monomers used in the initiator preparation. In addition, the above conjugated dienes containing reactive substituents along the chain can also be employed such as, for example, halogenated and alkoxy-substituted dienes such as chloroprene, fluoroprene, 2-methoxy-1,3-butadiene, 2-ethoxy-3-ethyl-1,3-butadiene, 2-ethoxy-3-methyl-1,3-hexadiene, and the like. Of the conjugated dienes, the preferred monomers are butadiene with isoprene and piperylene also being especially suitable. The conjugated dienes can be polymerized alone or in admixture with each other to form copolymers or by charging the dienes sequentially to form block copolymers.

In addition to the above-named conjugated dienes, other monomers can be copolymerized with these dienes, including such monomers as vinyl-substituted aromatic compounds such as styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of such derivatives include 3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decoxystyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methoxy-1-vinylnaphthalene
6-phenoxy-1-vinylnaphthalene
3,6-dimethylamino-1-vinylnaphthalene
7-dihexoxy-2-vinylnaphthalene, and the like.

The vinyl-substituted aromatic compounds can be copolymerized with the conjugated dienes to form random or block copolymers. Generally, the presence of a small amount of polar compound, such as the ether solvent in which the initiator is prepared, encourages the formation of random copolymers when both monomers are charged at the same time.

Polar monomers can be employed to form block copolymers with the conjugated dienes named. The polar monomer is charged after the conjugated diene has polymerized. Among the polar monomers applicable are vinylpyridines and vinylquinolines in which the vinyl group is positioned on a ring carbon other than a beta-carbon with respect to the nitrogen. These pyridine, quinoline, and isoquinoline derivatives can carry substituents such as alkyl, cycloalkyl, aryl, alkaryl, aralkyl, alkoxy, aryloxy, and dialkylamino groups. The total number of carbon atoms in the combined substituents is generally not greater than 12. Also, there should be no primary or secondary alkyl groups on ring carbons in the alpha and gamma positions with respect to the nitrogen. Examples of these heterocyclic-nitrogen monomers are 2-vinylpyridine
4-vinylpyridine
3,5-diethyl-4-vinylpyridine
5-methyl-2-vinylpyridine
5-n-octyl-2-vinylpyridine
3-n-dodecyl-2-vinylpyridine
3,5-di-n-hexyl-4-vinylpyridine
5-cyclohexyl-2-vinylpyridine
4-phenyl-2-vinylpyridine
3,5-di-tert-butyl-2-vinylpyridine
3-benzyl-4-vinylpyridine
6-methoxy-2-vinylpyridine
4-phenoxy-2-vinylpyridine
4-dimethylamino-2-vinylpyridine
3,5-dimethyl-4-diamylamino-2-vinylpyridine
2-vinylquinoline
4-vinylquinolne
2-tert-butyl-4-vinylquinoline
3-methyl-4-vinylquinoline
3-cyclohexyl-4-vinylquinoline
3-methyl-4-ethoxy-2-vinylquinoline
1-vinylisoquinoline
3-vinylisoquinoline
4-tert-dodecyl-1-vinylisoquinoline
3-dimethylamino-3-vinylisoquinoline
4-benzyl-3-vinylisoquinoline
4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, and N,N-diethylmethacrylamide. Vinylfuran and N-vinylcarbazole can also be used.

When it is desired that the polymer formed exhibit rubbery characteristics, the conjugated diene should be employed as a major amount of the monomer polymerized. The initiator compositions prepared according to this invention are particularly valuable in forming these conjugated diene polymers. It should be understood, however, that these initiator compositions can also be used when preparing homopolymers or copolymers of the vinyl-substituted aromatic compounds or the polar monomers named. Also, block copolymers can be formed between the vinyl-substituted aromatic compounds and these polar monomers.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

The polymerization reaction is generally carried out in the range between —100 and +150° C. and preferably between —75 and +75° C. The particular temperature employed will depend on both the monomers and the initiator used in preparing the polymers. The amount of initiator used is preferably in the range between about 1 and 30 millimoles per 100 grams of monomer. It is preferred that the polymerization be carried out in the presence of a suitable diluent such as benzene, toluene, cyclohexane, methylcyclohexane, xylene, n-butane, n-hexane, n-heptane, isooctane, or the like. Generally, the diluent is selected from hydrocarbons, for example, paraffins, cycloparaffins or aromatics containing from 4 to 10 carbon atoms per molecule.

The polymers that are thus prepared using the initiators according to my invention range from liquids to solid rubbery materials. The unquenched polymer solutions can be treated with various reagents to introduce functional groups replacing the terminal lithium atoms on the polymer molecules resulting from the polymerization itself. For example, polymer in solution can be contacted with carbon dioxide to replace the lithium atoms with —COOH groups. Other functional groups which can be introduced as disclosed in the above-mentioned copending application of Uraneck et al. include —SH, —OH, halogen and the like. Of particular interest are the carboxy-containing liquid polymers which can be cured to solid compositions alone or in the form of binders for solid materials. For example, the carboxy-telechelic polymers can be coupled and/or cured by reacting the polymer with tri(2-methyl-1-aziridinyl)phosphine oxide.

Other advantages of my invention are illustrated by the following examples. The specific materials and conditions given in the examples are presented as being typical and should not be construed to limit my invention unduly.

*Example I*

Three runs were made for the preparation of lithium adducts of 2,3-dimethyl-1,3-butadiene. A small amount of trans-stilbene was used as a promoter in one run, naphthalene was added to a second run, and the third run was made in the absence of a promoter. The reactions were carried out in 7-ounce bottles in an atmosphere of nitrogen. The bottles were capped, placed in a 122° F. bath, and subjected to mild agitation by tumbling throughout the reaction period. At the conclusion of each reaction a sample of the material was titrated with 0.1 N HCl in order to determine the molarity. The quantities of materials charged and results obtained are shown in the following table:

|  | Run No. | | |
| --- | --- | --- | --- |
|  | 1 | 2 | 3 |
| 2,3-Dimethyl-1,3-butadiene, mole | 0.1 | 0.1 | 0.17 |
| Lithium wire | Excess | Excess | Excess |
| Diethyl ether, ml | 90 | 90 | 100 |
| Trans-stilbene, mole | 0.005 |  |  |
| Naphthalene, mole |  | 0.005 |  |
| Moles promoter/mole diene | 0.05 | 0.05 |  |
| Concentration of diene solution, M | 1 | 1 | 1.4 |
| Temperature, °F | 122 | 122 | 122 |
| Time, hours | 3 | 16 | 24 |
| Molarity of adduct | 0.29 | 0.28 | 0.18 |
| Dimethylbutadiene units/2 Li, average [1] | 3.4 | 3.6 | 8 |

[1] Calculated from molarity of diene solution and molarity of initiator as determined by HCl titration, assuming complete reaction of the diene.

A fourth run was made for comparative purposes in which 0.4 mole of 2,3-dimethyl-1,3-butadiene, 1.6 gram atoms of lithium wire, and 650 milliliters of diethyl ether were charged to a flask and refluxed at atmospheric pressure (temperature approximately 35° C.), while being stirred vigorously, for 6 hours. An atmosphere of nitrogen was maintained throughout the reaction. Titration of a sample of the material with 0.1 N HCl showed that it was 0.28 molar and that it contained an average of two moles of diene per two gram atoms of lithium.

The data in the table show that the adducts prepared in the presence of promoters (trans-stilbene or naphthalene) had a much higher molarity than the control (Run 3) prepared in the absence of a promoter. A comparison of Runs 1 and 2 with 4 shows that the lower temperature and vigorous agitation are not essential for the production of the dilithium adducts if a promoter is employed. The concenerations of these solutions were essentially equal.

*Example II*

A dilithium adduct of 2,3-dimethyl-1,3-butadiene was prepared from the diene and lithium wire using diethyl ether as the solvent and trans-stilbene as the promoter. A portion of the diene was charged initially and the remainder was added in two increments. The reaction was effected in a 12-ounce bottle with the temperature being controlled at 86° F. The bottle was tumbled throughout the reaction period. A sample of the mixture was withdrawn and titrated with 0.1 N HCl at each stage of the reaction and the molarity determined. Quantities of materials charged and results obtained were as follows:

|  | Initial Charge | First Increment | Second Increment |
| --- | --- | --- | --- |
| 2,3-Dimethyl-1,3-butadiene, mole | 0.1 | 0.1 | 0.1 |
| Lithium wire, gram atom | 0.4 |  |  |
| Trans-stilbene, mole | 0.005 |  |  |
| Diethyl ether, ml | 90 |  |  |
| Moles stilbene/mole diene | 0.05 | 0.025 | 0.017 |
| Concentration of diene solution, M | 1 | 1.8 | 2.4 |
| Temperature, °F | 86 | 86 | 86 |
| Total time, hours | 3 | 7 | 11 |
| Molarity of adduct | 0.45 | 0.59 | 0.67 |
| Dimethylbutadiene units/2 Li, average | 2.2 | 3.0 | 3.6 |

After a reaction time of 11 hours, the bottle was removed from the 86° F. bath and allowed to stand at room temperature until the total time was three days. Another titration was made and the solution found to be 0.72 molar. This value corresponded to an average of 3.3 dimethylbutadiene units per 2 lithium atoms.

These results show that when trans-stilbene is present, the dilithium adduct of 2,3-dimethyl-1,3-butadiene can be prepared in fairly high concentrations with only mild agitation of the reactants.

*Example III*

Lithium, in the form of shot, was reacted with 2,3-dimethyl-1,3-butadiene at 75° F. using mild agitation (slow speed stirrer). A portion of the diene was charged initially and the remainder in two increments. The reaction was effected in a nitrogen atmosphere as in the preceding runs. Amounts of materials charged and results obtained are shown in the following table:

|  | 1 | 2 | 3 |
| --- | --- | --- | --- |
|  | Initial Charge | First Increment | Second Increment |
| 2,3-Dimethyl-1,3-butadiene, mole | 0.4 | 0.2 | 0.2 |
| Lithium shot, gram atom | 0.8 |  |  |
| Trans-stilbene, mole | 0.01 |  |  |
| Diethyl ether, ml | 400 |  |  |
| Moles stilbene/mole diene | 0.025 | 0.017 | 0.013 |
| Concentration of diene solution, M | 0.9 | 1.3 | 1.6 |
| Temperature, °F | 75 | 75 | 75 |
| Total time, hours | 3 | 4 | 5 |
| Molarity of adduct | 0.35 | 0.45 | 0.6 |
| Dimethylbutadiene units/2 Li, average | 2.6 | 2.9 | 2.7 |

These data and also those in Example II show that by incremental addition of the dimethylbutadiene, a solution of dilithium adduct of fairly high molarity can be obtained and polymerization of the diene kept within the desired range.

Two runs were made for the polymerization of butadiene using as the initiators the dilithium adducts designated as 1 and 3 in the preceding table. A run was made for comparative purposes in which the reaction product of lithium with trans-stilbene was used as the initiator. This material, 1,2-dilithio-1,2-diphenylethane, was used as a 0.3 molar solution in a mixture of diethyl ether and tetrahydrofuran. Polymerization recipes were as follows:

|  | Parts by Weight [1] | | |
|---|---|---|---|
|  | 1 | 2 | 3 |
| 1,3-Butadiene | 100 | 100 | 100 |
| Cyclohexane | 1,200 | 1,200 |  |
| Toluene |  |  | 1,280 |
| Lithium - dimethylbutadiene adduct, moles | [2] 15 | [3] 15 |  |
| Lithium-stilbene adduct, moles |  |  | 15 |
| Temperature, °F | 122 | 122 | 122 |
| Time, hours | 3 | 3 | 2 |
| Conversion, percent | 100 | 100 | 100 |
| Microstructure: |  |  |  |
| Vinyl, percent | 35.1 | 30.4 | 44.8 |
| Trans, percent | 38.9 | 42.2 | 30.4 |

[1] Unless otherwise designated.
[2] The 0.35 molar adduct designated as 1.
[3] The 0.6 molar adduct designated as 3.

The data show that polymers prepared in the presence of the lithium-dimethylbutadiene adducts had a much lower vinyl content than that prepared in the presence of the lithium-stilbene adduct. Run 2 gave a lower vinyl content than Run 1. These results can probably be explained on the basis of the amount of ether charged to the system. Ether promotes the formation of vinyl or 1,2-addition. Since the concentration of the initiator in Run 2 was higher, less ether was charged.

The percent trans 1,4-addition and 1,2-addition (vinyl) of the polymer was determined by infrared analysis. Polymer samples were dissolved in carbon disulfide to form a solution having 25 grams of polymer per liter of solution. The infrared spectrum of each of the solutions (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$ = extinction coefficient (liters-mols$^{-1}$-centimeters$^{-1}$); $E$ = extinction (log $I_0/I$); $t$ = path length (centimeters); and $c$ = concentration (mols double bond/liter). The extinction was determined at the 10.35 micron band and the extinction coefficient was 126 (liters-mols$^{-1}$-centimeters$^{-1}$).

The percent of the total unsaturation as 1,2- (or vinyl) was calculated according to the above equation, using the 11.0 micron band and an extinction coefficient of 173 (liters-mols$^{-1}$-centimeters$^{-1}$).

The percent of the total unsaturation present as cis 1,4 polymer can be obtained by subtracting the trans 1,4 and 1,2 (vinyl) determined according to the above procedure from the theoretical unsaturation, assuming 1 double bond for each $C_4$ unit in the polymer.

*Example IV*

A series of runs was made to study the effect of trans-stilbene on the formation of the lithium-dimethylbutadiene adduct. Runs were made at 122° F. in 7-ounce bottles using the procedure described in Example I. The progress of each reaction was followed by withdrawing samples at intervals and titrating them with 0.1 N HCl to determine molarity. Increments of stilbene were added in some of the runs. The following table shows materials charged and results obtained:

|  | Run No. | | | |
|---|---|---|---|---|
|  | 1 | 2 | 3 | 4 |
| Initial Charge: |  |  |  |  |
| 2,3-Dimethyl-1,3-butadiene, mole | 0.05 | 0.05 | 0.05 | 0.05 |
| Lithium wire, gram atom | 0.144 | 0.144 | 0.144 | 0.144 |
| Trans-stilbene, mole |  | 0.005 | 0.0006 | 0.0006 |
| Diethyl ether, ml | 94 | 94 | 94 | 94 |
| Moles stilbene/mole diene |  | 0.1 | 0.012 | 0.012 |
| Concentration of diene solution, M | 0.5 | 0.5 | 0.5 | 0.5 |
| Temperature, °F | 122 | 122 | 122 | 122 |
| Time, minutes | 26 | 26 | 26 | 26 |
| Molarity of adduct | 0.00 | 0.05 | 0.00 | 0.00 |
| First Increment: |  |  |  |  |
| Trans-stilbene, mole |  |  | 0.0006 | 0.0012 |
| Total time, hours | 1.6 | 1.6 | 1.6 | 1.6 |
| Molarity of adduct | 0.00 | 0.16 | 0.00 | 0.01 |
| Total time, hours | 20 | 20 | 20 | 20 |
| Molarity of adduct | 0.00 | 0.22 | 0.12 | 0.16 |
| Second Increment: |  |  |  |  |
| Trans-stilbene, mole |  |  | 0.0006 | 0.0006 |
| Total time, hours | 22.7 | 22.7 | 22.7 | 22.7 |
| Molarity of adduct | 0.00 | 0.22 | 0.12 | 0.16 |
| Diene units/2 Li, average |  | 2.3 | 4.1 | 3.1 |

These data show that with mild agitation there was no reaction in the absence of stilbene, whereas adducts having the desired composition were formed in the other runs even though the amount of stilbene was kept low in Runs 3 and 4.

Five-tenths gram (0.0028 mole) of trans-stilbene was added to Run 1 and samples of the material were titrated at intervals with 0.1 N HCl. This run was continued under the same conditions as before, i.e., the bottle was tumbled in a 122° F. bath. The results are shown below with the time being counted from the addition of the stilbene:

| Total Time, Hours | Molarity of Adduct | Diene Units/2 Li, Average |
|---|---|---|
| 1.5 | 0.18 | 2.8 |
| 2.3 | 0.18 | 2.8 |
| 18 | 0.20 | 2.5 |

These results show that the addition of stilbene made it possible to prepare the dilithium adduct.

*Example V*

A study was made to determine the effect of temperature on the formation of lithium-dimethylbutadiene adducts in a system containing stilbene. The runs were made in 7-ounce bottles and, as in all preceding runs, they were carried out in an atmosphere of nitrogen. Samples were withdrawn at intervals and titrated with 0.1 N HCl to determine molarity. Materials charged and results obtained are shown in the following table:

|  | Run No. | | | |
|---|---|---|---|---|
|  | 1 | 2 | 3 | 4 |
| 1,2-dimethyl-1,3-butadiene mole | 0.1 | 0.1 | 0.1 | 0.1 |
| Lithium wire, gram atom | 0.144 | 0.144 | 0.144 | 0.144 |
| Trans-stilbene, mole | 0.0055 | 0.0055 | 0.0055 | 0.0055 |
| Diethyl ether, ml | 90 | 90 | 90 | 90 |
| Moles stilbene/mole diene | 0.055 | 0.055 | 0.055 | 0.055 |
| Concentration of diene solution, M | 1 | 1 | 1 | 1 |
| Temperature, °F | 41 | 86 | 122 | −20.2 |

MOLARITY OF ADDUCTS AT VARIABLE REACTION TIMES

|  | 1 | 2 | 3 | 4 |
|---|---|---|---|---|
| 45 Minutes | 0.00 | 0.15 | 0.20 | 0.00 |
| 5 Hours | 0.20 | 0.37 | 0.28 | 0.00 |
| 15 Hours | ([1]) | ([1]) | ([1]) | 0.05 |
| 63 Hours | 0.44 | ([1]) | ([1]) | ([1]) |
| 96 Hours |  |  |  | 0.12 |
| Diene units/2 Li, average | 2.3 | 2.7 | 3.6 | 8.3 |

[1] Not determined.

The reaction time at the lowest temperature (Run 4) was not long enough for the most desirable adduct formation with the mild agitating conditions employed. This bottle was removed from the low temperature bath and allowed to stand overnight at room temperature (about 16 hours at 75° F.). At the end of this time, the solution had a molarity of 0.23 which corresponds to an average of 4.3 diene units/2 Li.

interfere with the sample to be titrated. The following table shows a summary of the runs:

| Run No. | Mole Ratio of Ingredients | | | | Molar Concn. in System | | Alkalinity,[2] 44 Hour |
|---|---|---|---|---|---|---|---|
| | Li | Naphthalene | DMBD[1] | Ether | Naphthalene | DMBD | |
| 1 | 3 | 1 | 1 | 8 | 0.96 | 0.96 | 1.16 |
| 2 | 3 | 1 | 1 | 4 | 1.55 | 1.55 | 1.52 |
| 3 | 3 | 1 | 1 | 3 | 1.85 | 1.85 | 1.42 |
| 4 | 3 | 1 | 1 | 2 | 2.27 | 2.27 | 1.45 |
| 5 | 3 | 1 | 0 | 4 | 1.89 | 0 | 0.24 |
| 6 | 3 | 0 | 1 | 4 | 0 | [3] 1.95 | 0.03 |
| 7 | 3 | 1 | 2 | 4 | 1.33 | 2.66 | 1.24 |
| 8 | 3 | 2 | 1 | 8 | 1.71 | 0.86 | 1.26 |

[1] 2,3-dimethyl-1,3-butadiene.
[2] Molarity of reaction product as determined by HCl titration. Theoretical alkalinity (or molarity) is based on complete reaction of naphthalene and should be equal to molarity of naphthalene in system prior to reaction.
[3] Theoretical alkalinity based on diene since no naphthalene was present.

Example VI

Initiator compositions were prepared from lithium, naphthalene, and 2,3-dimethyl-1,3-butadiene in the presence of variable amounts of diethyl ether. An excess of lithium was used in each case. Two control runs were made, one in the absence of dimethylbutadiene and the other in the absence of naphthalene. When carrying out these reactions, lithium wire and the other ingredients were charged initially to the reactor which had previously been flushed with nitrogen. The reactor was closed, placed in a constant temperature bath (41° F.), and the contents agitated throughout the reaction period. The efficiency or extent of each reaction was measured by withdrawing a sample of the mixture and titrating it with 0.1 N hydrochloric acid to determine the alkalinity (molarity). The unreacted lithium wire floated and did not A study of these data show that optimum results were obtained in Run 2 in which a 1/1/4 mole ratio of naphthalene/dimethylbutadiene/ether was used. As the amount of ether was decreased, the reaction became less efficient, i.e., there was a greater difference between the theoretical value and the alkalinity of the adduct determined by HCl titration. Nothing was gained by increasing the amount of dimethylbutadiene in Run 7. Results when dimethylbutadiene was decreased, are shown in Run 8. Runs 5 and 6 demonstrate that both ingredients are essential when preparing the adducts in the manner described.

Example VII

Lithium shot, naphthalene, and variable amounts of either isoprene or butadiene were reacted in ether at −26° C. (−14.8° F.) using the procedure described in Example VI. Following is a summary of the runs:

| Run No. | Mole Ratio of Ingredients | | | | | Alkalinity (Molarity) | | |
|---|---|---|---|---|---|---|---|---|
| | Li | Naphthalene | Isoprene | Butadiene | Ether | Theoretical | HCl Titration | |
| | | | | | | | 40 Hrs. | 64 Hrs. |
| 1 | 3 | 1 | 1 | | 4.5 | 1.50 | 1.51 | 1.53 |
| 2 | 3 | 1 | 1.5 | | 4.5 | 1.43 | 0.79 | 1.45 |
| 3 | 3 | 1 | 2 | | 4.5 | 1.36 | 0.62 | 0.80 |
| 4 | 3 | 1 | 3 | | 4.5 | 1.26 | ([1]) | 0.55 |
| 5 | 3 | 1 | 4 | | 4.5 | 1.15 | ([1]) | 0.49 |
| 6 | 3 | 1 | | 1 | 4.5 | 1.53 | 0.44 | [2] 1.00 |
| 8 | 3 | 1 | | 4 | 4.5 | 1.22 | ([1]) | [3] 0.20 |

[1] Could not be samples; undissolved naphthalene present.
[2] Value of 1.20 obtained after 146 hours.
[3] Value of 0.43 obtained after 146 hours.

It was assumed that the reaction products (adducts) had a density of 1 when calculating the theoretical alkalinity and that the naphthalene was all reacted.

These data show again that the best results are obtained when the naphthalene/diene mole ratio is 1/1. They also show that the adducts can be produced at low temperatures.

Example VIII

A series of runs was made to demonstrate the effect of temperature on the formation of initiators. Different condensed ring aromatic compounds and also stilbene (sym-diphenylethylene) were used, as well as different conjugated dienes. The procedure used was the same as in Example VI. Alkalinity of each adduct was determined by titration with 0.1 N HCl and results expressed as molarity, as in preceding examples. Following is a summary of the runs:

| Initiator, Components, Type and Amount | | | | | | Reaction Temp., °F. | Reaction Time, Hrs. | Molarity |
|---|---|---|---|---|---|---|---|---|
| Li, Moles | Aromatic or Stilbene | Moles | Conjugated Diene | Moles | Ether, Moles | | | |
| 5.8 | Stilbene | 1 | DMBD [1] | 4 | 13.6 | 41 | 72 | 1.05 |
| 5.8 | ...do... | 1 | DMBD [1] | 4 | 13.6 | 86 | 72 | 0.93 |
| 5.8 | ...do... | 1 | DMBD [1] | 4 | 13.6 | 122 | 72 | 0.78 |
| 3.6 | Naphthalene | 1 | DMBD [1] | 2.5 | 8 | 41 | 16 | 1.16 |
| 3.6 | ...do... | 1 | DMBD [1] | 2.5 | 8 | 86 | 16 | 0.99 |
| 4.8 | Anthracene | 1 | DMBD [1] | 3.3 | 11 | 41 | 16 | 0.58 |
| 4.8 | ...do... | 1 | DMBD [1] | 3.3 | 11 | 86 | 16 | 0.40 |
| 3 | Naphthalene | 1 | Bd [2] | 1.6 | 4.8 | −15 | 20 | 0.80 |
| 3 | ...do... | 1 | Bd [2] | 1.6 | 4.8 | 41 | 20 | 0.18 |
| 3 | ...do... | 1 | MBd [3] | 1.6 | 4.8 | −15 | 20 | 1.0 |
| 3 | ...do... | 1 | MBd [3] | 1.6 | 4.8 | 41 | 20 | 0.59 |
| 2.9 | Methylnaphthalene | 1 | MBd [3] | 1 | 4.5 | −15 | 40 | 1.7 |
| 2.9 | ...do... | 1 | MBd [3] | 1 | 4.5 | 41 | 40 | 1.47 |

[1] 2,3-dimethyl-1,3-butadiene.
[2] 1,3-butadiene.
[3] Isoprene.

These data show that in each group of runs, lower temperatures favored a more efficient reaction, as measured by the molarity of the product. Higher temperatures can be used with dimethylbutadiene than with the other dienes, and better results are obtained at the higher temperatures with stilbene and naphthalene than with anthracene.

Example IX

Two initiators were prepared and the products titrated with 0.1 N HCl to determine alkalinity. Recipes and results are shown below:

| | | |
|---|---|---|
| Diethyl ether, moles | 4.8 | 4.8 |
| Naphthalene, moles | 1 | 1 |
| α-Methylstyrene, moles | 2 | 0 |
| Lithium shot, moles | 2.9 | 2.9 |
| Temperature, °F | 122 | 122 |
| Time, Hours | 34 | 34 |
| Molarity of adduct | 2.33 | 0.17 |

These results show that an adduct of much higher molarity is obtained when α-methylstyrene is used in conjunction with the naphthalene.

Example X

An initiator composition was prepared in ether using the following recipe:

| | Moles |
|---|---|
| Diethyl ether | 4.5 |
| Isoprene | 1 |
| Naphthalene | 1 |
| Lithium | 3 |
| Temperature, °F. | −13 |
| Time, hours | 67 |
| Molarity (by 0.1 N HCl titration) | 1.60 |

A portion of the adduct, which was in the form of a slurry as prepared, was solubilized by the addition of 4 moles of 1,3-butadiene per mole of adduct. The butadiene was added in 5 increments at a temperature of 41° F. Molarity after solubilization was 1.15.

Two runs were made for the polymerization of butadiene using the adduct as prepared in one run as the initiator and the solubilized material in the other. The following polymerization recipe was employed:

| | |
|---|---|
| Toluene, parts by weight | 1290 |
| 1,3-butadiene, parts by weight | 100 |
| Initiator, millimoles | 15 |
| Temperature, °F. | 122 |
| Time, hours | 2 |
| Conversion, percent | 100 |

Immediately following polymerization, each reaction mixture was carbonated using a T-tube. Carbon dioxide gas, under a pressure of 15 to 18 p.s.i.g., and the polymer solution were fed into separate arms of the tube where they were mixed. An instantaneous reaction occurred upon contact of the carbon dioxide with the polymer solution. The carbonated solution was treated with HCl gas until the mixture was acid. It was then washed with water until neutral, the solvent removed, and the dried polymer recovered. Products from the two runs were liquids which had the following properties:

| | Products from— | |
|---|---|---|
| | Initiator as Originally Prepared | Solubilized Initiator |
| Brookfield viscosity at 77° F., poises | >4,000 | 1,060 |
| Carboxy content, wt. percent | 0.71 | 1.07 |
| Microstructure, percent: | | |
| Cis, by difference | 25.4 | 26.9 |
| Trans | 46.3 | 45.0 |
| Vinyl | 28.3 | 28.1 |

These data show that a polymer of lower viscosity and higher carboxy content is obtained when the initiator is solubilized prior to charging it to the polymerization system. In both runs the polymer had a satisfactory vinyl content.

Example XI

An initiator composition was prepared in ether in accordance with the following recipe:

| | Moles |
|---|---|
| Diethyl ether | 4.8 |
| 2,3-dimethyl-1,3-butadiene | 1 |
| Naphthalene | 1 |
| Lithium | 2.9 |
| Temperature, °F. | 41 |
| Time, hours | 72 |
| Molarity (by 0.1 N HCl titration) | 1.65 |

The initiator was used for the polymerization of butadiene in accordance with the following recipe:

| | |
|---|---|
| Cyclohexane, parts by weight | 780 |
| 1,3-butadiene, parts by weight | 100 |

Initiator, millimoles _____ 20
Temperature, °F. _____ 122
Time, hours _____ 1.5
Conversion, percent _____ 100

The polymer solution was carbonated as described in in Example X. The liquid product had the following properties:

Brookfield viscosity at 77° F., poises _____ 1104
Carboxy content, wt. percent _____ 1.02
Microstructure, percent—
    Cis, by difference _____ 41.0
    Trans _____ 36.8
    Vinyl _____ 22.2

*Example XII*

The initiator described in Example XI was used for the copolymerization of butadiene with styrene in accordance with the following recipe:

Cyclohexane, parts by weight _____ 780
1,3-butadiene, parts by weight _____ 90
Styrene, parts by weight _____ 10
Initiator, millimoles _____ 20
Temperature, °F. _____ 122
Time, hours _____ 1.75

Following polymerization, the solution was carbonated in the manner described in Example X. The liquid copolymer had the following properties:

Brookfield viscosity at 77° F., poises _____ 2664
Carboxy content, wt. percent _____ 1.05
Microstructure, percent (values calculated on butadiene portion)—
    Cis, by difference _____ 29.7
    Trans _____ 44.7
    Vinyl _____ 25.6

*Example XIII*

A series of initiators was prepared by reacting lithium wire, methylnaphthalene (a commercial mixture containing 90 percent 1-methylnaphthalene and 10 percent 2-methylnaphthalene), and either isoprene or butadiene, in ether. All ingredients were charged initially and the mixtures agitated at the temperature specified. The reaction products were obtained as slurries. The molarity was determined by titration with 0.1 N HCl. Prior to being used for the polymerization of butadiene, each was treated with butadiene or isoprene to effect solubilization. This treatment was effected at 41° F. with the conjugated diene being added in 7 or 8 increments. A summary of the several initiator preparations is shown in the following table:

| | Run No. | | | | | | | |
|---|---|---|---|---|---|---|---|---|
| | 1 | 2 | 3 | 4 | 5 | 6 | 7 | 8 |
| Initiator Recipe:[1] | | | | | | | | |
|   Lithium Wire | 2.9 | 2.9 | 2.9 | 2.9 | 2.9 | 2.9 | 2.9 | 2.9 |
|   Methylnaphthalene | 1 | 1 | 1 | 1 | 1 | 1 | 1 | 1 |
|   Isoprene | 1 | 4 | 1 | | 1 | 1 | 1 | 1 |
|   1,3-Butadiene | | | | 1 | | | | |
|   Diethyl ether | 4.5 | 4.5 | 4.5 | 4.5 | 4.5 | 4.5 | 4.5 | 4.5 |
|   Temperature, °F | −15 | −15 | 41 | −15 | −15 | −15 | −15 | −15 |
|   Time, hours | 40 | 64 | 40 | 40 | 20 | 64 | 40 | 40 |
|   Molarity | 1.70 | 1.06 | 1.47 | 1.45 | 1.10 | 1.95 | 1.70 | |
|   Appearance of adduct | (2) | (2) | (2) | (2) | (2) | (2) | (2) | (2) |
| Solubilization: | | | | | | | | |
|   1,3-Butadiene | 4 | 1 | 4 | 4 | 4 | 4 | | 8 |
|   Isoprene | | | | | | | 3 | |
|   Molarity | 1.30 | 0.92 | 1.09 | 1.05 | 0.87 | 1.15 | 1.30 | 1.05 |
|   Appearance of adduct | (3) | (4) | (3) | (3) | (3) | (3) | (3) | (3) |

[1] Quantities are given in moles.
[2] Slurry.
[3] Visc. red soln.
[4] Some slurry.

Each of the foregoing initiators was used for the polymerization of butadiene in accordance with the following recipe:

Cyclohexane, parts by weight _____ 936
1,3-butadiene _____ 100
Initiator, millimoles _____ 20
Temperature, °F. _____ 122
Time, hours _____ 1.5
Conversion, percent _____ 100

Immediately following polymerization, the reaction mixtures were carbonated as described in Example X. The carbonated solutions were treated with a mixture of concentrated hydrochloric acid and isopropyl alcohol (70 to 90 volume percent isopropyl alcohol in mixture) to convert the lithium salt groups to carboxy groups. The polymer solutions were washed with water and dried. The products had the following properties (run designations correspond to initiator Runs 1 to 8):

| Run No. | Brookfield Visc. at 77° F., Poises | COOH Content, percent | Vinyl Content, percent |
|---|---|---|---|
| 1 | 650 | 1.29 | 26.2 |
| 2 | 2,892 | 1.10 | |
| 3 | 672 | 1.18 | 28.1 |
| 4 | 680 | 1.26 | 27.9 |
| 5 | 832 | 1.11 | 25.4 |
| 6 | 694 | 1.23 | 25.5 |
| 7 | 708 | 1.25 | 25.2 |
| 8 | 674 | 1.16 | 25.9 |

The initiators in Runs 1 and 2 contained the same ingredients but the mole ratio of methylnaphthalene/isoprene in Run 2 was 1/4. This initiator was treated with only one mole of butadiene in the solubilization step, making a total of 5 moles of diene present in each of the initiators. Run 2 gave a much higher viscosity than is normally desired for a liquid polymer.

A comparison of Runs 1 and 4 shows that there is no appreciable difference in polymer properties when butadiene is used instead of isoprene in preparation of the initiator. A comparison of Runs 1 and 8 shows that isoprene can be substituted for butadiene in the solubilization step.

*Example XIV*

Lithium was reacted with butadiene and isoprene in accordance with the following recipes:

| | A | B |
|---|---|---|
| Isoprene, mole | 0.10 | |
| 1,3-Butadiene, mole | | 0.10 |
| Lithium wire, gram atom | 0.40 | 0.40 |
| Naphthalene, mole | variable | variable |
| Diethyl ether, milliliters | 100 | 100 |
| Temperature, °F | variable | variable |
| Time, hours | variable | variable |

The reactions were carried out in an atmosphere of nitrogen. The alkalinity, expressed as normality, was determined by withdrawing a sample and titrating it with 0.1 N HCl. Maximum normality was calculated assuming complete conversion of the diene, two lithium atoms reacting per molecule of diene. From the normality determined by titration and maximum normality previously calculated, the average number of diene units per two lithium atoms is calculated, assuming complete conversion of the diene. This value is represented by "$n$" in the table and is an approximate value but is indicative of the nature of the reaction. Results of the runs are shown in the following table:

| Run No. | Recipe | Naphthalene, mole | Temp., °F. | Alkalinity, N ||||| n |
|---|---|---|---|---|---|---|---|---|---|
| | | | | Maximum | 24 Hrs. | 48 Hrs. | 72 Hrs. | 144 Hrs. | |
| 1 | A | 0 | −15 | 1.8 | | | 0 | 0 | |
| 2 | A | 0 | 41 | 1.8 | 0 | | 0 | | |
| 3 | B | 0 | −15 | 1.8 | | | 0 | 0 | |
| 4 | A | 0.02 | −15 | 2.14 | 0.30 | 0.95 | | | 2.2 |
| 5 | A | 0.02 | 41 | 2.14 | 0.48 | 0.48 | | | 4.5 |
| 6 | A | 0.02 | 86 | 2.14 | 0.22 | 0.28 | | | 7.6 |
| 7 | B | 0.02 | −15 | 2.14 | | | 0.18 | 0.36 | 5.9 |
| 8 | B | 0.02 | 41 | 2.14 | 0.17 | 0.17 | | | 12.6 |

These data show that no reaction with either diene occurred in the absence of naphthalene. When naphthalene was present, reaction products with $n$ less than 10 were formed with isoprene at all three temperatures, but with butadiene, the value for $n$ was outside the desired range when the temperature was 41° F. The lower temperature gave satisfactory results.

Reaction products from Runs 4 and 5 were employed as initiators for the polymerization of butadiene using the following recipe:

| | |
|---|---|
| 1,3-butadiene, parts by weight | 100 |
| Toluene, parts by weight | 1000 |
| Initiator, millimoles | 25 |
| Temperature, °F. | 122 |
| Time, hours | 1.5 |

Charge order: Toluene—nitrogen purge—butadiene—initiator.

Following polymerization, each of the reaction mixtures was carbonated using a T-tube. Carbon dioxide, under a pressure of 15 to 18 p.s.i.g. and the polymer solution were fed into separate arms of the tube where they were mixed. Transfer of the polymer solution from the reactor into the T-tube was effected by nitrogen under a pressure of 20 p.s.i.g. An instantaneous reaction occurred upon contact of carbon dioxide with the lithium-containing polymer. The reaction mixture was transferred to an open vessel through the third arm of the tube and treated with an excess of dilute hydrochloric acid. The aqueous and organic phases were separated, the organic phase was washed with water, and the carboxy-containing polymer was recovered by evaporation of the solvent. Results obtained were as follows:

| Initiator from Run | Brookfield Visc. at 77° F. Poise | COOH, percent | Microstructure, percent | | |
|---|---|---|---|---|---|
| | | | Cis [1] | Trans | Vinyl |
| 4 | 1,370 | 1.32 | 30.2 | 34.7 | 35.1 |
| 5 | 635 | 1.70 | 30.1 | 37.1 | 32.8 |

[1] By difference.

Microstructures on the foregoing samples and also those in Examples X, XI and XIII were determined as described for Example III except that an Infracord was used with extinction coefficients of 146 for trans and 209 for vinyl.

As will be apparent to those skilled in the art from the above disclosure, various modifications can be made in my invention without departing from the spirit or scope thereof.

I claim:

1. A method of preparing a polymerization initiator composition which comprises contacting lithium with a monomer selected from the group consisting of conjugated dienes having 4 to 12 carbon atoms per molecule and vinylidene-substituted benzene and naphthalene compounds having other hydrocarbon substituents totaling up to 12 carbon atoms in a medium of ether having the formula R—O—R wherein each R is an alkyl group containing from 2 to 12 carbon atoms in the presence of about 0.005 to 2 moles per mole of said monomer of a promoter selected from the group consisting of polycyclic aromatic compounds and polyaryl-substituted ethylenes containing from 2 to 4 aryl groups selected from the group consisting of phenyl and naphthyl at about −40 to 170° F. for at least about 10 minutes, the amount of said ether being about 1 to 20 moles per mole of said monomer, and the ratio of lithium to monomer being at least about 1 gram atom of lithium per mole of monomer.

2. The method of claim 1 wherein the temperature of the reaction is in the range of −25 to 125° F.

3. The method of claim 1 wherein said monomer is 2,3-dimethyl-1,3-butadiene, said ether is diethyl ether and said promoter is trans-stilbene.

4. The method of claim 1 wherein said monomer is 1,3-butadiene and the temperature is below 41° F.

5. The method of claim 1 wherein said promoter is naphthalene.

6. The method of claim 1 wherein said monomer is isoprene and the temperature is below 100° F.

7. The method of claim 1 wherein said monomer is alpha-methylstyrene and said promoter is naphthalene.

8. The method of claim 1 wherein said monomer is 2,3-dimethyl-1,3-butadiene and said promoter is anthracene.

9. The method of claim 1 wherein said monomer is isoprene and said promoter is methylnaphthalene.

10. A method of preparing a polymerization initiator composition which comprises reacting together a monomer selected from the group consisting of butadiene, isoprene and styrene with at least 2 gram atoms of lithium per mole of said monomer and from 0.1 to 2 moles of polycyclic aromatic compound per mole of said monomer at a temperature in the range of −40 to 41° F. and in a medium of ether having the formula R—O—R wherein each R is an alkyl group containing 2 to 12 carbon atoms, and adding to the resulting composition in said ether from 2 to 10 moles of said monomer per mole of lithium adduct at a temperature in the range of about 20 to 60° F., thereby rendering said composition soluble in hydrocarbon diluent.

References Cited in the file of this patent

UNITED STATES PATENTS 2,146,447    Scott _____ Feb. 7, 1939

FOREIGN PATENTS 1,162,710    France _____ Sept. 16, 1958

OTHER REFERENCES

Ziegler: "Rubber Chem. Tech.," pp. 501–507, 1938.
Whitby: "Synthetic Rubber," pp. 734–42, John Wiley and Sons, Inc., New York, 1954.